(12) United States Patent
Lee et al.

(10) Patent No.: US 8,345,196 B2
(45) Date of Patent: Jan. 1, 2013

(54) LIQUID CRYSTAL DISPLAY

(75) Inventors: Chang-hun Lee, Yongin-si (KR);
Hee-seop Kim, Hwaseong-si (KR);
Jun-woo Lee, Anyang-si (KR);
JianGang Lu, Yongin-si (KR); Eun-hee Han, Seoul (KR)

(73) Assignee: Samsung Display Co., Ltd. (KR)

( * ) Notice: Subject to any disclaimer, the term of this patent is extended or adjusted under 35 U.S.C. 154(b) by 663 days.

(21) Appl. No.: 12/603,554

(22) Filed: Oct. 21, 2009

(65) Prior Publication Data

US 2010/0039576 A1 Feb. 18, 2010

Related U.S. Application Data

(63) Continuation of application No. 11/499,495, filed on Aug. 4, 2006, now Pat. No. 7,626,667.

(30) Foreign Application Priority Data

Aug. 5, 2005 (KR) .................. 10-2005-0071898

(51) Int. Cl.
*G02F 1/1337* (2006.01)
*G02F 1/136* (2006.01)
*G02F 1/1333* (2006.01)
*G02F 1/1343* (2006.01)

(52) U.S. Cl. .......... 349/126; 349/46; 349/128; 349/132; 349/138; 349/141; 349/178

(58) Field of Classification Search ............ 349/46, 349/123–126, 128, 130, 132–134, 138, 139, 349/141, 178
See application file for complete search history.

(56) References Cited

U.S. PATENT DOCUMENTS

| 5,434,690 | A  | * | 7/1995  | Hisatake et al. ............... 349/8 |
| 5,621,558 | A  | * | 4/1997  | Shimada et al. ............. 349/130 |
| 6,469,765 | B1 |   | 10/2002 | Matsuyama et al. |
| 7,190,429 | B2 |   | 3/2007  | Yoshida et al. |
| 2004/0004690 | A1 | * | 1/2004 | Yamaguchi et al. ......... 349/141 |

FOREIGN PATENT DOCUMENTS

| CN | 1637513 A      | 7/2005  |
| JP | 08-313915      | 11/1996 |
| JP | 10111494 A     | 4/1998  |
| JP | 10-319365      | 12/1998 |
| JP | 2000267104 A   | 9/2000  |
| JP | 2000356786 A   | 12/2000 |
| JP | 2002-023184    | 1/2002  |
| JP | 2002031812 A   | 1/2002  |
| JP | 2002-040457    | 2/2002  |
| JP | 2003-295192    | 10/2003 |
| KR | 10-1999-0051849 A | 7/1999 |
| KR | 1020000047995 A | 7/2000 |
| KR | 10-2001-0039664 A | 5/2001 |

* cited by examiner

*Primary Examiner* — Uyen Chau N Le
*Assistant Examiner* — Michael Mooney
(74) *Attorney, Agent, or Firm* — Innovation Counsel LLP

(57) ABSTRACT

A liquid crystal display with better visibility and transmittance. The liquid crystal display includes a first plate having a first field-generating electrode, disposed in a pixel area on an insulating substrate, comprising a plurality of sub-electrodes which are separated from each other by a predetermined distance and arranged parallel to each other, and a connecting electrode electrically connecting the sub-electrodes. An alignment film that is rubbed in a first direction covers a first field-generating electrode and an alignment film that is rubbed in a second direction covers a second field-generating electrode to achieve a predetermined orientation of the liquid crystals when no field is applied and more uniform rotation of the liquid crystal molecules when a field is applied.

19 Claims, 13 Drawing Sheets

LIQUID CRYSTAL DISPLAY

REFERENCE TO RELATED APPLICATION

This application is a continuation application of U.S. patent application Ser. No. 11/499,495 filed Aug. 4, 2006 which claims priority from Korean Patent Application No. 10-2005-0071898 filed on Aug. 5, 2005 in the Korean Intellectual Property Office, the disclosure of which is incorporated herein by reference.

FIELD OF THE INVENTION

The present invention relates to a liquid crystal display having better visibility and light transmittance.

DESCRIPTION OF THE RELATED ART

The liquid crystal display ("LCD"), is a flat panel display that includes two plates having a plurality of electrodes with a liquid crystal layer between them. Voltages applied to the electrodes rearrange the liquid crystal molecules thereby displaying images by varying the amount of transmitted light. In the LCD, thin film transistors are used as switching elements for controlling the application of picture signals to the electrodes.

The vertical alignment (VA) mode LCD aligns the long axes of the LC molecules perpendicularly to the plates in absence of electric field. The VA mode LCD offers a wide reference viewing angle and large contrast ratio. The wide viewing angle can be realized by forming cutouts or protrusions in each field-generating electrode so that the reultant fringe field more uniformly distributes the tilt angles of the liquid crystal molecules. The patterned vertically aligned (PVA) mode of forming cutout patterns in electrodes is a recognized way of achieving a wide viewing angle and is an alternative to using the horizontal electric field mode such as the in-plane switching (IPS) mode or the fringe field switching (FFS) mode.

However, the PVA-mode liquid crystal display shows a lateral gamma curve distortion so that the front gamma curve and the lateral gamma curve do not agree to each other resulting in lower left and right visibility than the twisted nematic (TN)-mode liquid crystal display. For example, PVA-mode liquid crystal displays having cutouts as domain-defining members show images that become bright and white toward the lateral side, and in the worst case, the luminance difference between high grays vanishes such that the images cannot be perceived.

SUMMARY OF THE INVENTION

The present invention provides a liquid crystal display with better visibility, light transmittance, which has high process efficiency and can prevent electric field distortion.

According to an aspect of the present invention, there is provided a liquid crystal display including a first plate having a first field-generating electrode disposed in a pixel area of on insulating substrate, comprising a plurality of sub-electrodes which are separated from each other by a predetermined distance and arranged parallel to each other, and a connecting electrode electrically connecting the sub-electrodes, and a first alignment film covering the first field-generating electrode said first alignment film having been rubbed in a first direction, a second plate having a second field-generating electrode disposed on an insulating substrate, and a second alignment film covering the second field-generating electrode said second alignment film having been rubbed in a second direction, and a liquid crystal layer interposed between the first plate and the second plate.

According to another aspect of the present invention, there is provided a liquid crystal display having a first plate including a first field-generating electrode disposed in a pixel area of an insulating substrate, and a first alignment film covering the first field-generating electrode said first alignment film having been rubbed in a first direction, a second plate having a second field-generating electrode, disposed on an insulating substrate, said second field-generating electrode having a plurality of openings formed parallel to each other in an area corresponding to the pixel area of the first plate, and a second alignment film covering the second field-generating electrode said second alignment film having been rubbed in a second direction, and a liquid crystal layer interposed between the first plate and the second plate.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION

Figure 1:
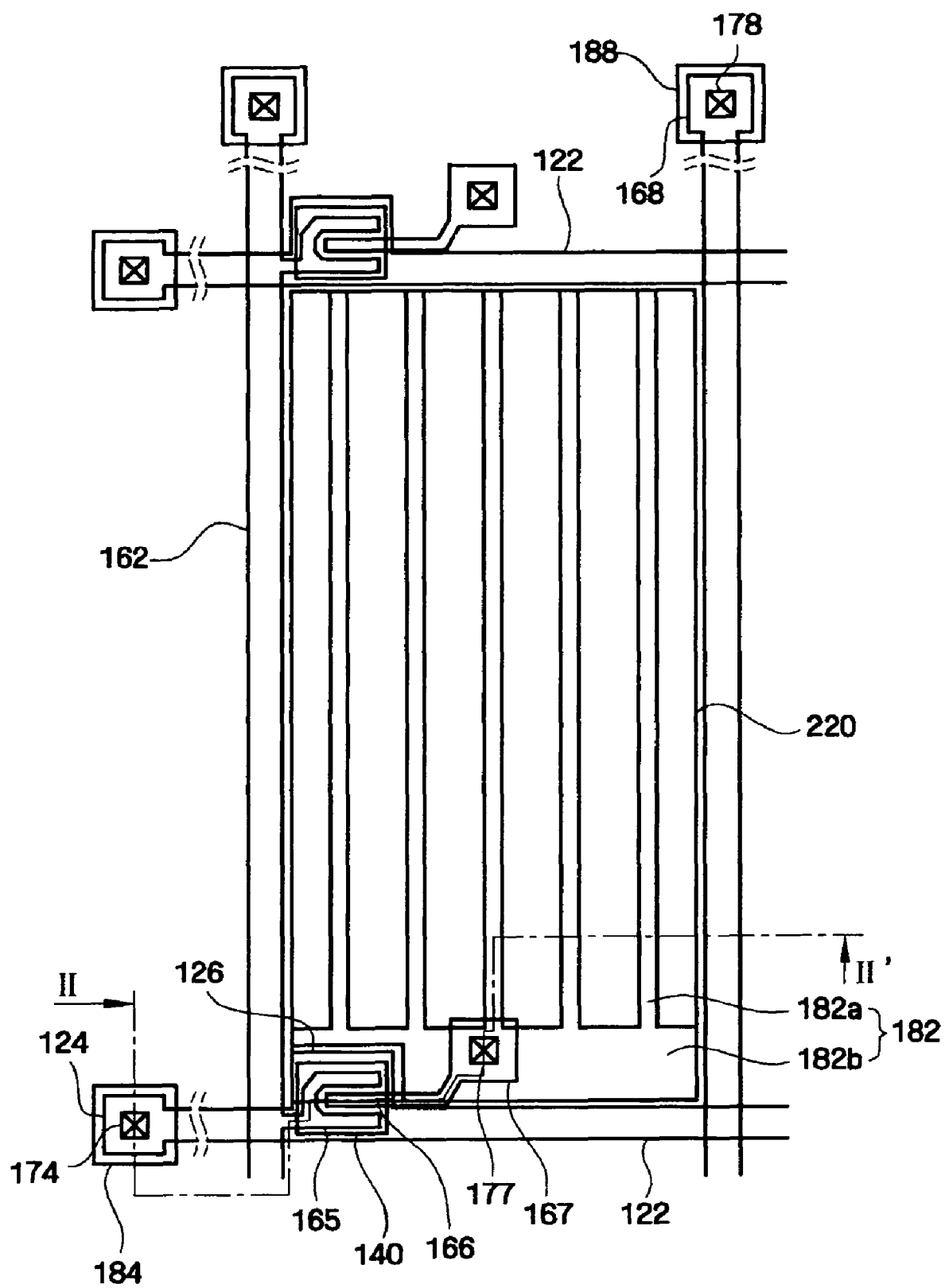
FIG. 1 is a layout of a liquid crystal display according to a first embodiment of the present invention.

Advantages and features of the present invention and methods of accomplishing the same may be understood more readily by reference to the following detailed description of preferred embodiments and the accompanying drawings. Like reference numerals refer to like elements throughout the specification.

Figure 2:
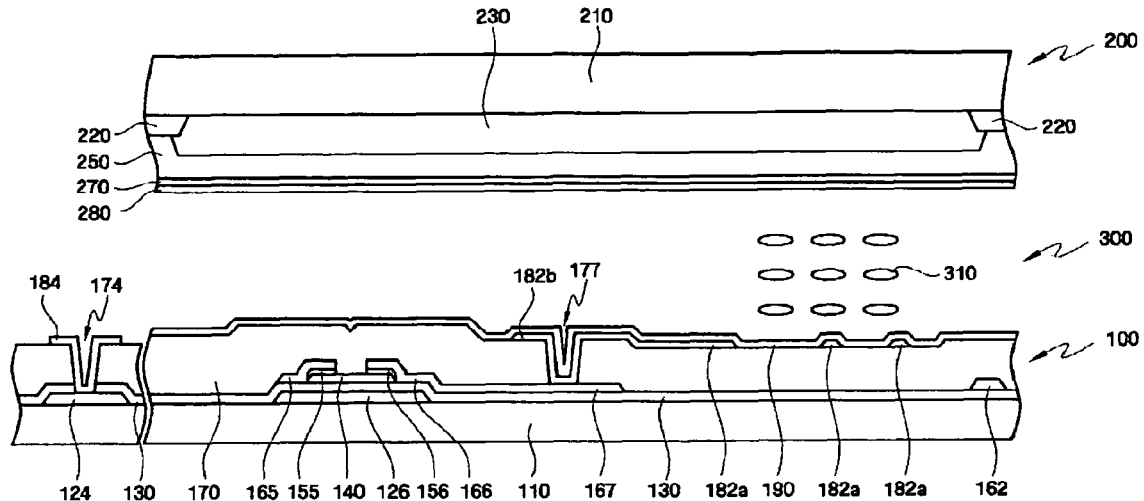
FIG. 2 is a sectional view taken along a line II-II' of FIG. 1.

Hereinafter, a liquid crystal display according to a first embodiment of the present invention will be described with reference to FIGS. 1 and 2. FIG. 1 is a layout of a liquid crystal display according to a first embodiment of the present invention and FIG. 2 is a sectional view taken along a line II-II' of FIG. 1.

The liquid crystal display includes a first plate 100, a second plate 200 facing the first plate 100, and a liquid crystal layer 300, interposed between the first plate 100 and the second plate 200, including liquid crystal molecules 310 aligned horizontally with respect to the first and second plates 100, 200.

First, with respect to the first plate 100, a pixel electrode 182 made of transparent conductive oxide such as an indium tin oxide (ITO) or indium zinc oxide (IZO) is disposed on a substrate 110 made of a transparent insulating material such as glass. The pixel electrode 182 is a field-generating electrode and includes a plurality of sub-electrodes 182*a* parallel to and separated from each other by a predetermined distance and a connecting electrode 182*b* electrically connecting the sub-electrodes 182*a*. The pixel electrode 182 is connected to a thin film transistor to receive an image signal voltage. The thin film transistor is connected to a gate line 122 responsible for scan signal transmission and a data line 162 responsible for image signal transmission, and turns on/off the pixel electrode 182 according to a scan signal. An alignment film is disposed on the substrate 110 having thereon the pixel electrode 182. Alignment film 190 allows the liquid crystal molecules 310 of the liquid crystal layer 300 to be horizontally aligned in a voltage-off state.

In addition, with respect to the second plate 200, a black matrix 220 for preventing light leakage, a color filter 230 composed of red, green, and blue components, and a common electrode 270. which is a field-generating electrode made of transparent conductive oxide such as ITO or IZO are formed on a lower surface of a substrate 210 made of a transparent insulating material such as glass.

An alignment film 280 is disposed on substrate 210 having thereon common electrode 270. Alignment film 280 allows the liquid crystal molecules 310 of the liquid crystal layer 300 to be horizontally aligned in a voltage-off state.

A liquid crystal display according to the first embodiment of the present invention will be described in more detail.

First, with respect to the first plate 100, gate wires formed on the substrate 110 include the gate line 122 extending in a transverse direction, a gate pad 124 connected to an end of the gate line 122 to receive a gate signal from an external device and transmit the received gate signal to the gate line 122, and a gate electrode 126 of a thin film transistor which is connected to the gate line 122 and formed in a protrusion shape. Here, the gate wires may have a single layered structure including a conductive layer made of an Al containing metal such as Al or an Al alloy, or a multi-layered structure (not shown) including another layer made of, particularly, a material that shows physically, chemically and electrically good contact characteristics with respect to ITO or IZO, such as Cr, Ti, Ta, Mo or an alloy thereof, formed on the conductive layer.

A gate insulating film 130 made of silicon nitride (SiNx), etc. is disposed on the substrate 110 and the gate wires.

Data wires including a source electrode 165 and a drain electrode 166 are disposed on the gate insulating film 130. The data wires extending along a longitudinal direction intersect the gate wires, defining a pixel region shaped of, for example, a rectangle. The data wires include a data line 162, a source electrode 165 as a branch of the data line 162, a drain electrode 166 formed in the neighbourhood of the source electrode 165 and a data pad 168 formed at an end of the data line 162. Like the gate wires, the data line 162, the source electrode 165, the drain electrode 166, and the data pad 168 may have a single layered structure including a conductive layer made of an Al containing metal such as Al or an Al alloy, or a multi-layered structure (not shown) including another layer made of, particularly, a material that shows physically, chemically and electrically good contact characteristics with respect to ITO or IZO, such as Cr, Ti, Ta, Mo or an alloy thereof, formed on the conductive layer.

A semiconductor layer 140 defining a channel region of a thin film transistor is formed in an island shape below the source electrode 165 and the drain electrode 166. In addition, ohmic contact layers 155 and 156 are formed of, for example, silicide or n+ hydrogenated silicon doped with a high concentration of n-type impurities, on the semiconductor layer 140 to reduce contact resistance between the source/drain electrodes 165 and 166 and the semiconductor layer 140.

A passivation layer 170 made of an inorganic insulating material such as silicon nitride or an organic insulating material such as resin is formed on the data wires. Contact holes 177 and 178 exposing the drain electrode 166 and the data pad 168, respectively, are formed on the passivation layer. In addition, a contact hole 174 is formed on the passivation layer through the gate insulating layer 130 to expose the gate pad 124.

A pixel electrode 182 electrically connected to the drain electrode 166 via the contact hole 177 is disposed on the passivation layer. The pixel electrode 182 includes the plurality of the sub-electrodes 182*a* and the connecting electrode 182*b* connecting the sub-electrodes 182*b*. The sub-electrodes 182*b* of the pixel electrode 182 may have a predetermined shape, for example, stripes formed in parallel with longer sides of the pixel area. In this case, a width of each of the sub-electrodes 182*a* and a distance between the sub-electrodes 182*b* depend on optical properties of an LCD. For example, a width of each of the sub-electrodes 182*a* may be approximately 6 µm or less, and a distance between the sub-electrodes 182*a* may range from approximately 4 to approximately 14 µm. If the width of each of the sub-electrodes 182*a* is 4 µm, the distance between the sub-electrodes 182*a* may be approximately 11 µm. The connecting electrode 182*b* of the pixel electrode 182 is formed to electrically connect the respective sub-electrodes 182*a* to each other. The connecting electrode 182*b* may be formed by connecting the respective sub-electrodes 182*a* to each other at either side or both sides of the sub-electrodes 182a or at the central portion of sub-electrodes 182a, and a connecting portion of the respective sub-electrodes 182a is not particularly limited. The pixel electrode 182 applied with a pixel voltage generates an electric field together with common electrode 270 of the second plate 200, thereby determining the directions of the liquid crystal molecules 310 of the liquid crystal layer 300 between pixel electrode 182 and common electrode 270.

An auxiliary gate pad 184 and an auxiliary data pad 188 connected to a gate pad 124 and a data pad 168 via the contact holes 174 and 178, respectively, are also disposed on the passivation layer. The auxiliary gate pad 184 and the auxiliary data pad 188 complement adhesions to external circuit devices and protect the gate pad 124 and the data pad 168. The auxiliary gate pad 184 and the auxiliary data pad 188 may be made of ITO or IZO.

As referenced above, alignment film 190 is disposed on the substrate 110 having the pixel electrode 182. Alignment film 190 is a horizontal-alignment film that allows the liquid crystal molecules 310 of the liquid crystal layer 300 to be aligned horizontally with respect to the substrate 110 in a voltage-off state. An alignment film may be used to allow the liquid crystal molecules 310 to have a pre-tilt angle of, for example, 0.5 to 3 degrees, to prevent the formation of two or more domains in a voltage-on state. In addition, alignment film 190 is rubbed so that the liquid crystal molecules 310 of the liquid crystal layer 300 are aligned at an angle of $\alpha$ with respect to the sub-electrodes 182a in a voltage-off state. Here, the angle of $\alpha$ may be determined by the known optical properties of the liquid crystal display, and may be an arbitrary angle except 0 and 90 degrees. For example, the angle of $\alpha$ may be an angle in the range between 60 and 85 degrees.

The second plate 200 will next be described. A black matrix 220 for preventing light leakage is disposed on the surface of substrate 210 facing the first plate 100. Color filter 230 composed of red, green, and blue components is disposed on black matrix 220. An overcoat layer 250 is disposed on color filter 230 to planarize the stepped surface of the color filter.

Common electrode 270 is disposed on overcoat layer 250. Common electrode 270 may be made of, for example, a transparent conductive material such as ITO or IZO.

Alignment film 280 is disposed on substrate 210 having thereon common electrode 270. Alignment film 280 is rubbed so that the liquid crystal molecules 310 are aligned horizontally with respect to the surface of substrate 210 at a pretilt angle of, for example, 0.5 to 3 degrees, in a voltage-off state. Alignment film 280 is rubbed in the opposite direction to the rubbing direction of alignment film 190 of the first plate 100, i.e., so that the rubbing direction of the alignment film and the rubbing direction of the alignment film form an angle of 180 degrees. For example, alignment film 190 of the first plate 100 and alignment film 280 of the second plate 200 may be rubbed at an angle of $\alpha$ under the condition that the rubbing direction of alignment film 190 and the rubbing direction of alignment film 280 form an angle of 180 degrees. The angle of $\alpha$ may depend upon settings in optical properties of the LCD and may be an arbitrary angle except 0 and 90 degrees, for example, an angle in the range between 65 and 80 degrees.

The liquid crystal layer 300 including the liquid crystal molecules 310 is interposed between the above-described thin film transistor-containing first plate 100 and color filter-containing second plate 200. The liquid crystal molecules 310 are horizontally aligned between the first plate 100 and the second plate 200, and have negative dielectric anisotropy ($\Delta\epsilon<0$), i.e., the long axes of the liquid crystal molecules 310 are aligned vertically with respect to an applied electric field.

The liquid crystal molecules 310 are driven according to the on/off state of pixels in such a way that their long axes are substantially parallel to the surfaces of the substrates 110 and 210.

Figure 3:
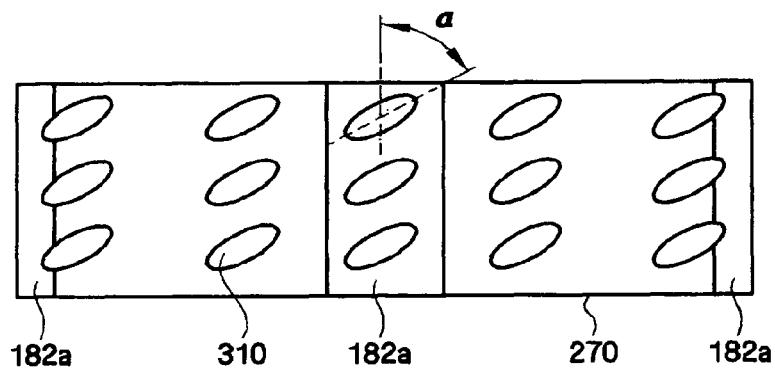
FIGS. 3 and 4 are respectively schematic plan and sectional views illustrating the arrangement of liquid crystal molecules when a thin film transistor of the liquid crystal display according to the first embodiment of the present invention is in an "OFF" state.
Figure 4:
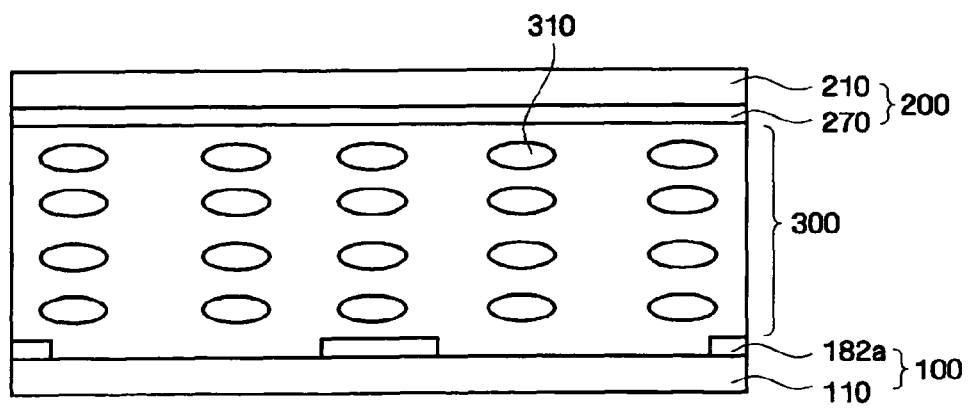

Next, the arrangement of the liquid crystal molecules 310 in the on/off state of a thin film transistor of the liquid crystal display according to the illustrative embodiment will now be described with reference to FIGS. 2 through 5. FIGS. 3 and 4 are respectively schematic plan and sectional views illustrating the arrangement of liquid crystal molecules when a thin film transistor of the liquid crystal display according to the first embodiment of the present invention is in an "OFF" state, and FIG. 5 is a schematic sectional view illustrating the arrangement of liquid crystal molecules when a thin film transistor of the liquid crystal display according to the first embodiment of the present invention is in an "ON" state.

First, referring to FIGS. 2 through 4, in the "OFF" state of the thin film transistor, liquid crystal molecules 310 between common electrode 270 and the underlying sub-electrodes 182a are aligned parallel to the rubbing direction of the horizontal alignment films so that their long axes are inclined at a pretilt angle of 0.5 to 3 degrees with respect to substrates 110 and 210. For example, alignment film 190 of the first plate 100 is rubbed such that it has a tilt angle of 60° to 85° with respect to the sub-electrode 182a and alignment film 280 of the second plate 200 is rubbed such that it has a tilt angle of 180° with respect to the rubbing direction of alignment film 190 of the first plate 100. In the latter case, the long axes of the liquid crystal molecules 310 are arranged at an angle of approximately 60 to 85° with respect to the sub electrode 182a.

Figure 5:
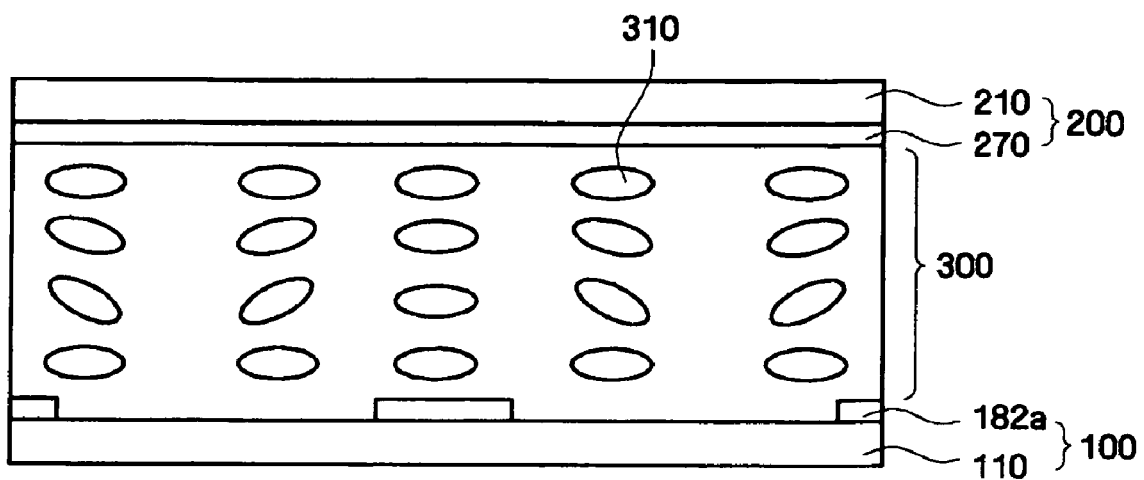
FIG. 5 is a schematic sectional view illustrating the arrangement of liquid crystal molecules when a thin film transistor of the liquid crystal display according to the first embodiment of the present invention is in an "ON" state.

Next, referring to FIGS. 2 and 5, when the thin film transistor is turned-on and an image signal is applied to the pixel electrode 182, an electric field is generated between the first plate 100 and the second plate 200. At this time, the central portions of sub-electrodes 182a direct a vertical electric field toward corresponding portions of common electrode 270. However, the side portions of sub-electrodes 182a direct an outwardly curved horizontal electric field. The liquid crystal molecules 310 adjacent to the alignment films 190 and 280 maintain their original alignments because of the anchoring energy on the alignment films 190 and 280. The liquid crystal molecules 310 disposed in the central area of liquid crystal layer 300 are rotated so that their long axes are aligned vertically with respect to the applied electric field due to their negative dielectric anisotropy. In a voltage-off state, the liquid crystal molecules 310 are tilted at a predetermined angle with respect to the sub-electrodes 182a by rubbing of the alignment films 190 and 280. In a voltage-on state, the liquid crystal molecules 310 are uniformly rotated in the same direction based on the tilted angle.

Pixel electrode 182 of the first plate 100 includes a plurality of the sub-electrodes 182a having a predetermined shape, whereas common electrode 270 of the second plate 200 is not subjected to patterning. This offers process simplicity, compared to patterning the field-generating electrodes of both he first and second plates. Also, there is no need to use a separate conductive polarization plate for preventing electrostatic marks or abnormal domains that may be caused by common electrode patterning of an upper plate, leading to cost-saving. Furthermore, since common electrode 270 is not subjected to patterning, there is no misalignment between the pixel electrode 182 of the first plate 100 and common electrode 270 of the second plate 200, thereby avoiding distortion of the electric field. Still furthermore, an overlap area between the pixel electrode 182 and common electrode 270 is reduced, thereby leading to low liquid crystal capacitance. In addition, since the liquid crystal molecules 310 are tilted at a predetermined angle with respect to the sub-electrodes 182a in a voltage-off state, they can be uniformly rotated in the same direction in a voltage-on state. Therefore, the liquid crystal display of this embodiment is free from textures that are caused between liquid crystal molecules rotating in different directions, thereby leading to no abnormal domains. Further, since the liquid crystal molecules 310 disposed at side portions of the sub-electrodes 182a and between adjacent ones of the sub-electrodes 182a are aligned vertically with respect to a horizontal electric field, transmittance equal to or greater than a PVA-mode is obtained. Still further, the liquid crystal display of this embodiment shows maximal transmittance compared to another liquid crystal displays using liquid crystal molecules with higher dielectric anisotropy and the same voltage, and the in-plane movement of the directors of the liquid crystal molecules 310 increases, thereby ensuring better visibility.

Figure 6:
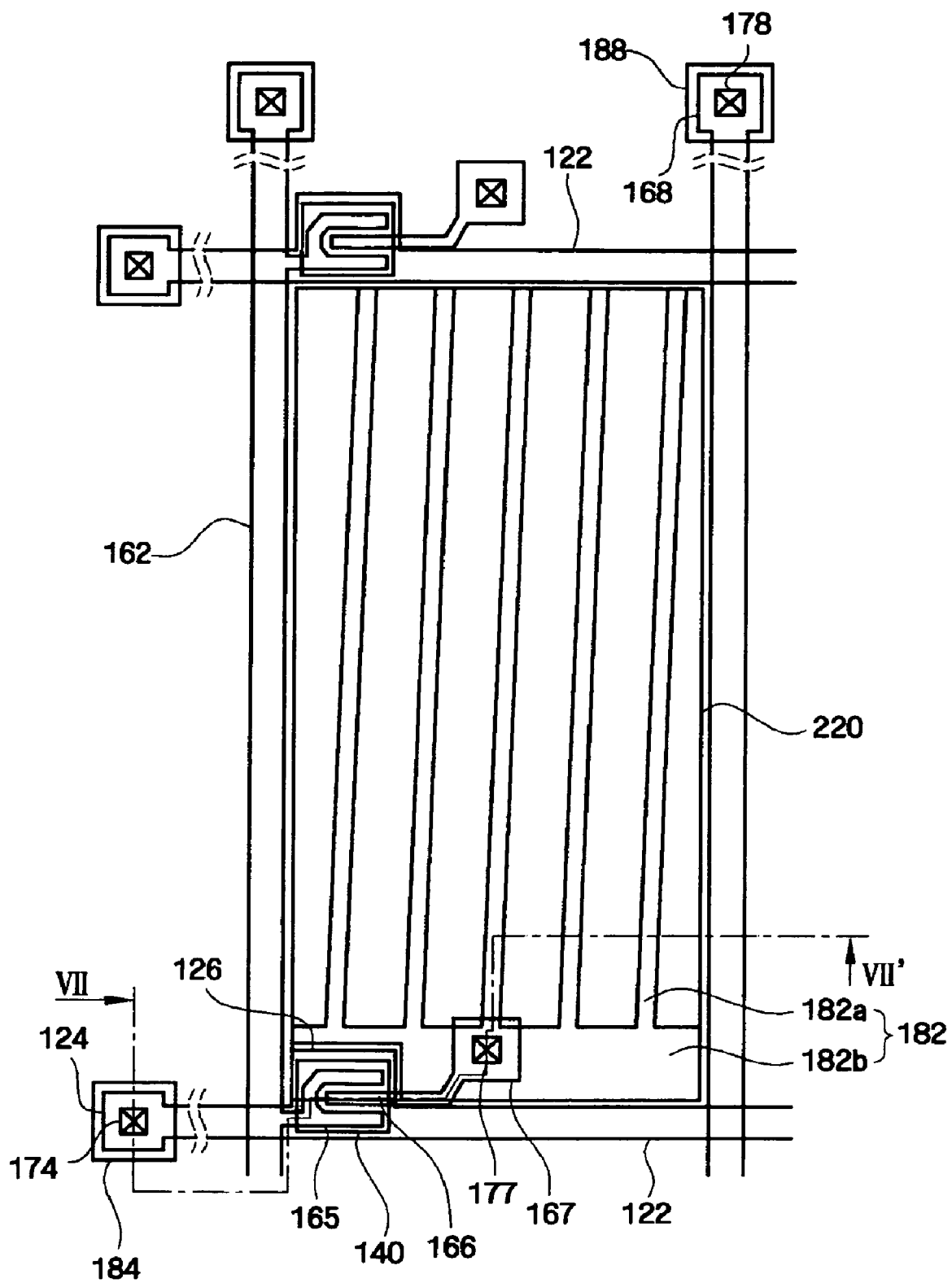
FIG. 6 is a layout of a liquid crystal display according to a second embodiment of the present invention.

Hereinafter, a liquid crystal display according to a second embodiment of the present invention will be described with reference to FIGS. 6 and 7. FIG. 6 is a layout of a liquid crystal display according to the second embodiment of the present invention, and FIG. 7 is a sectional view taken along a line VII-VII' of FIG. 6.

The liquid crystal display of the second embodiment is the same as the liquid crystal display of the first embodiment of the present invention except that alignment film 190 of the first plate 100 and alignment film 280 of the second plate 200 are rubbed at an angle of 90 degrees with respect to the longer side of a pixel area under the condition that the rubbing direction of alignment film 190 of the first plate 100 and the rubbing direction of alignment film 280 of the second plate 200 form an angle of 180 degrees, and sub-electrodes 182a are formed parallel to each other in a state in which they are inclined at a predetermined angle, e.g., an angle from 60 to 85 degrees, with respect to the rubbing direction of the alignment film of the first plate 100. Thus, the repeated descriptions will be omitted.

Next, the liquid crystal molecule arrangement in the on/off state of a thin film transistor of the liquid crystal display according to the second embodiment will now be described with reference to FIGS. 7 through 10. FIGS. 8 and 9 are respectively schematic plan and sectional views illustrating the arrangement of liquid crystal molecules when a thin film transistor of the liquid crystal display according to the second embodiment of the present invention is in an "OFF" state, and FIG. 10 is a schematic sectional view illustrating the arrangement of liquid crystal molecules when a thin film transistor of the liquid crystal display according to the second embodiment of the present invention is in an "ON" state.

Figure 7:
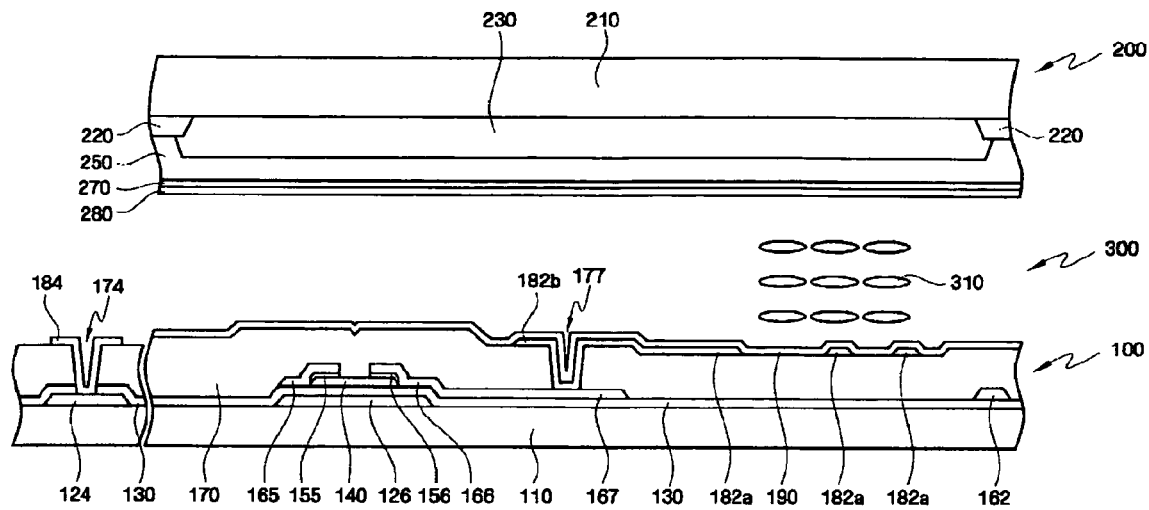
FIG. 7 is a sectional view taken along a line VII-VII' of FIG. 6.
Figure 8:
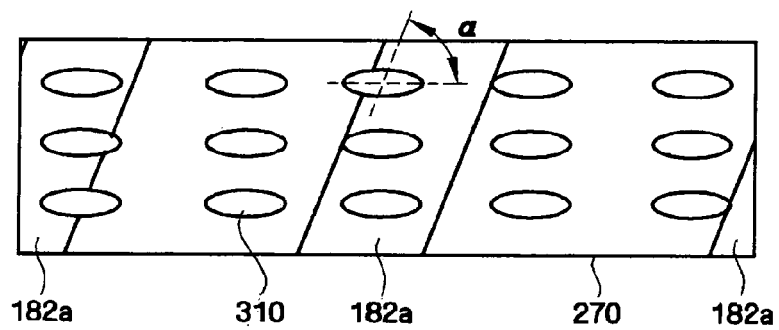
FIGS. 8 and 9 are respectively schematic plan and sectional views illustrating the arrangement of liquid crystal molecules when a thin film transistor of the liquid crystal display according to the second embodiment of the present invention is in an "OFF" state.
Figure 9:
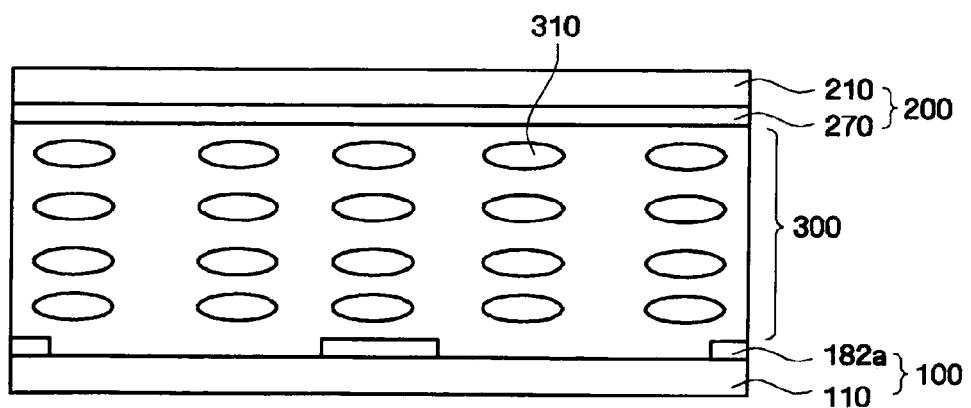

First, referring to FIGS. 7 through 9, with respect to the liquid crystal molecule arrangement in an "OFF" state thin film transistor, the sub-electrodes 182a are formed parallel to each other in a state in which they are inclined at a predetermined angle, e.g., at an angle of 60 to 85 degrees with respect to the rubbing direction of the alignment film of the first plate 100 rubbed at an angle of 90 degrees with respect to the longer side of the pixel area. Liquid crystal molecules 310 between a pixel electrode 182 including the sub-electrodes 182a and a common electrode 270 are aligned parallel to the rubbing direction of the horizontal alignment films in a state in which their long axes are inclined at a pretilt angle of 0.5 to 3 degrees with respect to the surfaces of first and second substrates 110 and 210. That is, the long axes of the liquid crystal molecules 310 are arranged at an angle of approximately 90° with respect to a longer side of the pixel area. Consequently, the along axes of the liquid crystal molecules 310 are arranged at a tilt angle (α) of approximately 60 to approximately 85° with respect to the sub electrode 182a.

Figure 10:
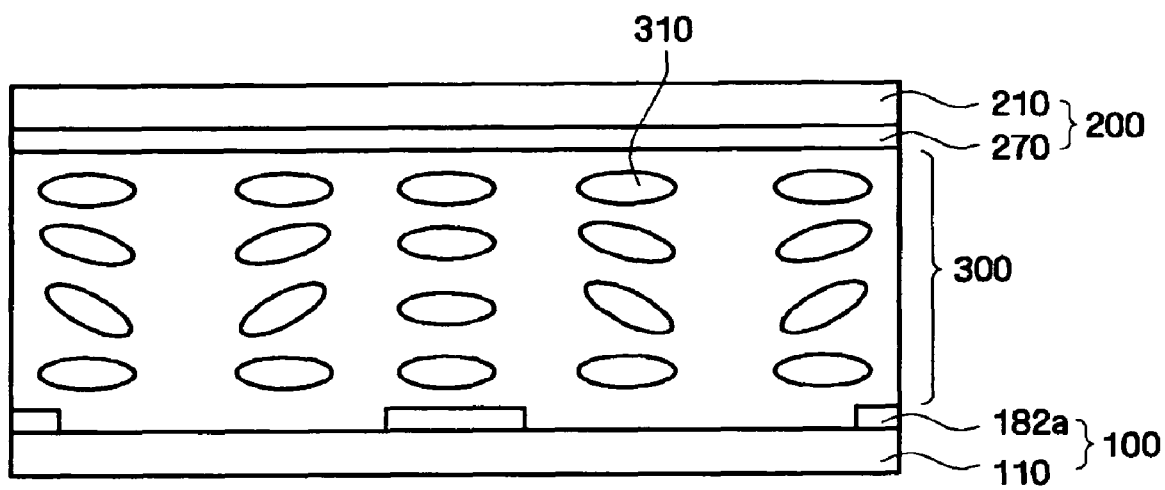
FIG. 10 is a schematic sectional view illustrating the arrangement of liquid crystal molecules when a thin film transistor of the liquid crystal display according to the second embodiment of the present invention is in an "ON" state.

Next, referring to FIGS. 7 and 10, with respect to the arrangement of the liquid crystal molecules 310 in an "ON" state thin film transistor, when the thin film transistor is turned-on and an image signal is applied to the pixel electrode 182, an electric field is generated between the first plate 100 and the second plate 200. At this time, as described above in the liquid crystal molecule arrangement of the liquid crystal display of the previous embodiment, in central portions of the sub-electrodes 182a, there is generated a vertical electric field directing toward portions of common electrode 270 corresponding to the central portions of the sub-electrodes 182a. On the other hand, referring to FIG. 21 a horizontal electric field which is not directed to common electrode 270 but is curved outward is generated in side portions(a, b) of the sub-electrodes 182a. The liquid crystal molecules 310 adjacent to the alignment films 190 and 280 maintain their original alignments, whereas the liquid crystal molecules 310 disposed in the central area of the liquid crystal layer 300 are rotated so that their long axes are aligned vertically with respect to an applied electric field due to the negative dielectric anisotropy. At this time, the liquid crystal molecules 310 are uniformly rotated in the same direction based on a tilted angle created by rubbing of the alignment films 190 and 280.

In the liquid crystal display of this embodiment, like the liquid crystal display of the previous embodiment, common electrode 270 is not subjected to patterning. Therefore, process simplicity and cost-saving effect are obtained, and electric field distortion caused by a misalignment between the first plate 100 and the second plate 200 does not occur. Furthermore, an overlap area between the pixel electrode 182 and common electrode 270 is minimized, thereby ensuring low liquid crystal capacitance. Still furthermore, the liquid crystal molecules 310 are uniformly rotated in the same direction, and thus the formation of textures and thus abnormal domains is excluded. In addition, transmittance equal to or greater than a PVA-mode is obtained, and even more, the liquid crystal display of the second embodiment shows maximal transmittance compared to another liquid crystal displays using liquid crystal molecules with higher dielectric anisotropy and the same voltage, and the in-plane movement of the directors of the liquid crystal molecules 310 is increased, thereby ensuring better visibility.

Hereinafter, a liquid crystal display according to a third embodiment of the present invention will be described with reference to FIGS. 11 and 12.

Figure 11:
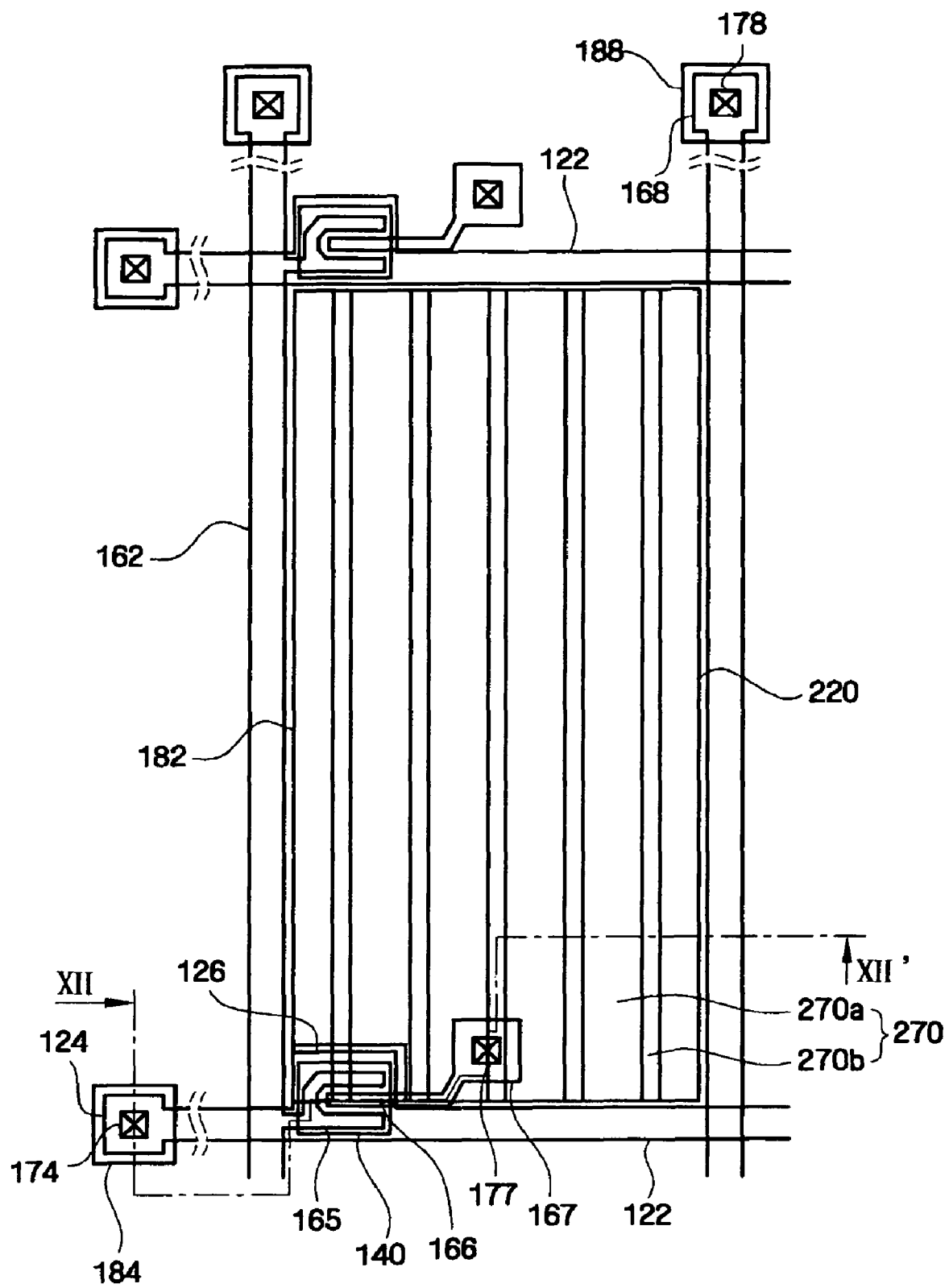
FIG. 11 is a layout of a liquid crystal display according to a third embodiment of the present invention.
Figure 12:
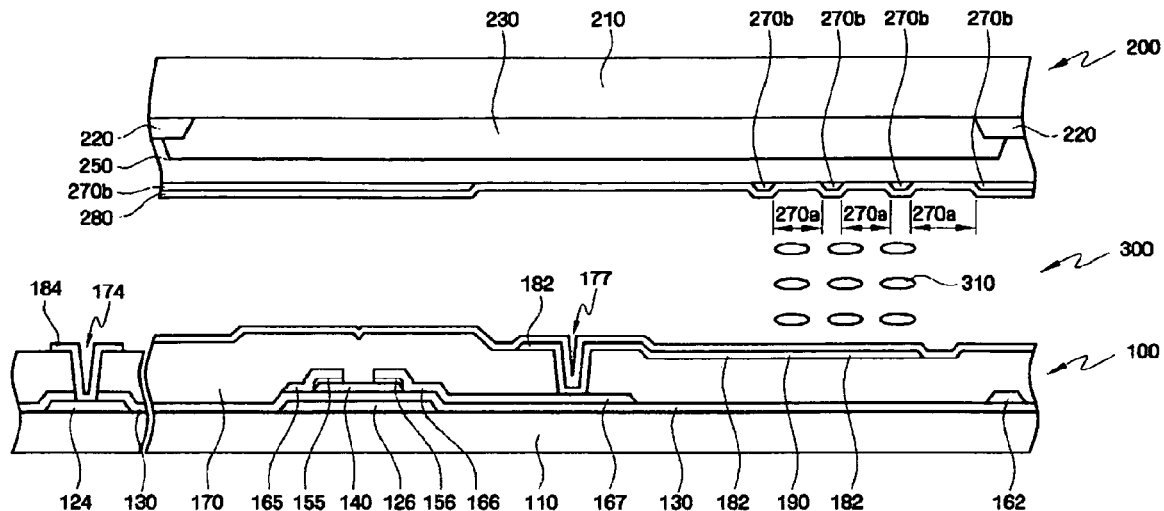
FIG. 12 is a sectional view taken along a line XII-XII' of FIG. 11.

FIG. 11 is a layout of a liquid crystal display according to a third embodiment of the present invention, and FIG. 12 is a sectional view taken along a line XII-XII' of FIG. 11.

A first plate 100 of the liquid crystal display of the third embodiment is the same as the first plate 100 of the liquid crystal display of the first embodiment of the present invention except a pixel electrode 182 and an alignment film 190, and thus, the repeated description thereof will not be given and only differences will now be described.

Referring to FIGS. 11 and 12, the pixel electrode 182 electrically connected to a drain electrode 166 via a contact hole 177 is disposed on a passivation layer 170. The pixel electrode 182 is disposed in a pixel area defined by intersections between gate lines 122 and data lines 162. For example, the pixel electrode 182 may be made of a transparent conductive material such as ITO or IZO.

Alignment film 190 is disposed on a substrate 110 having thereon the pixel electrode 182. Alignment film 190 is a horizontal alignment film that allows liquid crystal molecules 310 of a liquid crystal layer 300 to be aligned horizontally with respect to the surface of the substrate 110 in a voltage-off state. For example, the alignment film may be an alignment film that allows the liquid crystal molecules 310 to have a pretilt angle of 0.5 to 3 degrees. The alignment film is rubbed so that the liquid crystal molecules 310 of the liquid crystal layer 300 are aligned at an angle of α with respect to openings 270a of a common electrode 270 as will be described later in a voltage-off state. The angle of α may depend upon set optical properties of the LCD and may be an arbitrary angle except 0 and 90 degrees, for example, an angle in the range between 60 and 85 degrees.

A second plate 200 of the liquid crystal display of the third embodiment is the same as the second plate 200 of the liquid crystal display of the first embodiment of the present invention except common electrode 270 and an alignment film 280, and thus, the repeated description thereof will not be given and only differences will now be described.

Referring to FIGS. 11 and 12, common electrode 270 including a plurality of the openings 270a and a plurality of common electrode portions 270b is disposed on an overcoat layer 250. For example, the openings 270a of common electrode 270 may be formed in a predetermined stripe shape to be parallel to the longer side of the pixel area. At this time, a width of each opening 270a and a width of each common electrode pattern 270b between the openings 270a, i.e., a distance between the openings 270a are determined by the optical properties of a liquid crystal display. For example, the width of each opening 270a may be a range from approximately 4 to 14 μm, and the distance between the openings 270a may be 6 μm or less. For example, when the width of each opening 270a is 11 μm, the distance between the openings 270a may be 4 μm. Common electrode 270 may be made of a transparent conductive oxide material such as ITO or IZO.

As described above, alignment film 280 is disposed on a substrate 210 having thereon common electrode 270. Alignment film 280 is a horizontal alignment film that allows the liquid crystal molecules 310 to be aligned horizontally with respect to the surface of substrate 210 in a voltage-off state. For example, alignment film 280 may be an alignment film that allows the liquid crystal molecules 310 to have a pretilt angle of 0.5 to 3 degrees. The alignment film is rubbed so that the liquid crystal molecules 310 are aligned at an angle of α with respect to the openings 270a in a voltage-off state. At this time, the rubbing direction of the alignment film, together with the rubbing direction of the alignment 280 film of the first plate 100, forms an angle of 180 degrees.

Figure 13:
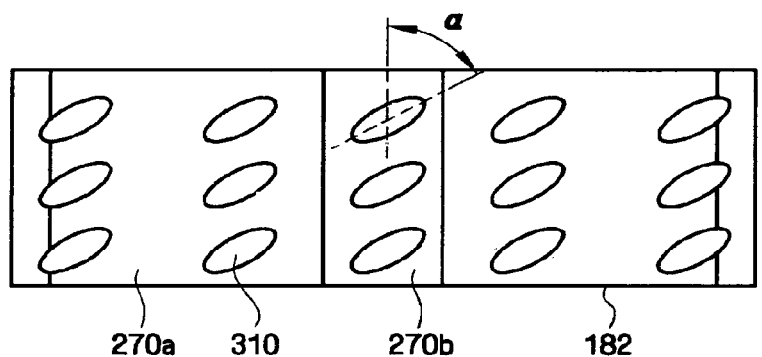
FIGS. 13 and 14 are respectively schematic plan and sectional views illustrating the arrangement of liquid crystal molecules when a thin film transistor of the liquid crystal display according to the third embodiment of the present invention is in an "OFF" state.
Figure 14:
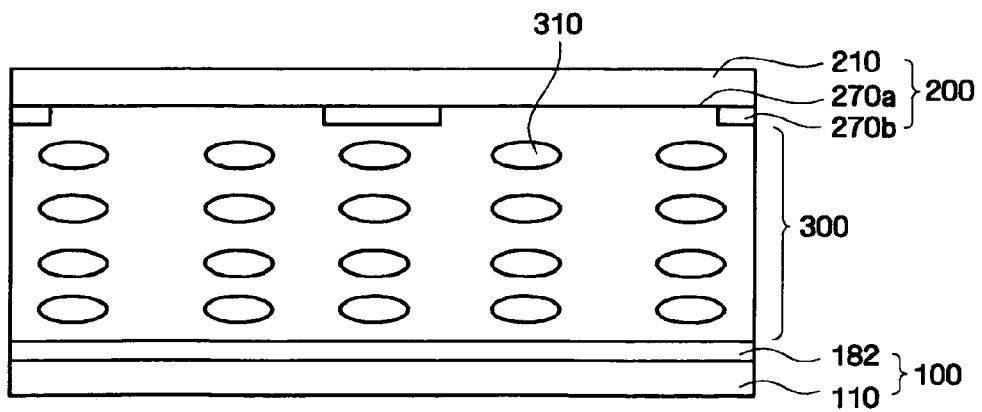

Next, referring to FIGS. 12 through 15, the arrangement of the liquid crystal molecules 310 in the on/off state of a thin film transistor of the liquid crystal display according to the third embodiment will now be described. FIGS. 13 and 14 are respectively schematic plan and sectional views illustrating the arrangement of liquid crystal molecules when a thin film transistor of the liquid crystal display according to the third embodiment of the present invention is in an "OFF" state, and FIG. 15 is a schematic sectional view illustrating the arrangement of liquid crystal molecules when a thin film transistor of the liquid crystal display according to the third embodiment of the present invention is in an "ON" state.

First, referring to FIGS. 12 through 14, with respect to the arrangement of the liquid crystal molecules 310 in an "OFF" state thin film transistor, the liquid crystal molecules 310 between the pixel electrode 182 formed in a pixel area and the overlying common electrode 270 including a plurality of the openings 270a parallel to the longer side of the pixel area are aligned parallel to the rubbing direction of the horizontal alignment films so that their long axes are inclined at an angle of 0.5 to 3 degrees with respect to the surfaces of the substrates 110 and 210. For example, when the alignment films 190 and 280 of the first and second substrates 110 and 210 are rubbed in opposite directions such that they have a tilt angle of 60° to 85° with respect to the opening 270a, the long axes of the liquid crystal molecules 310 are arranged at a tilt angle (α) of approximately 60 to approximately 85° with respect to the opening 270a.

Figure 15:
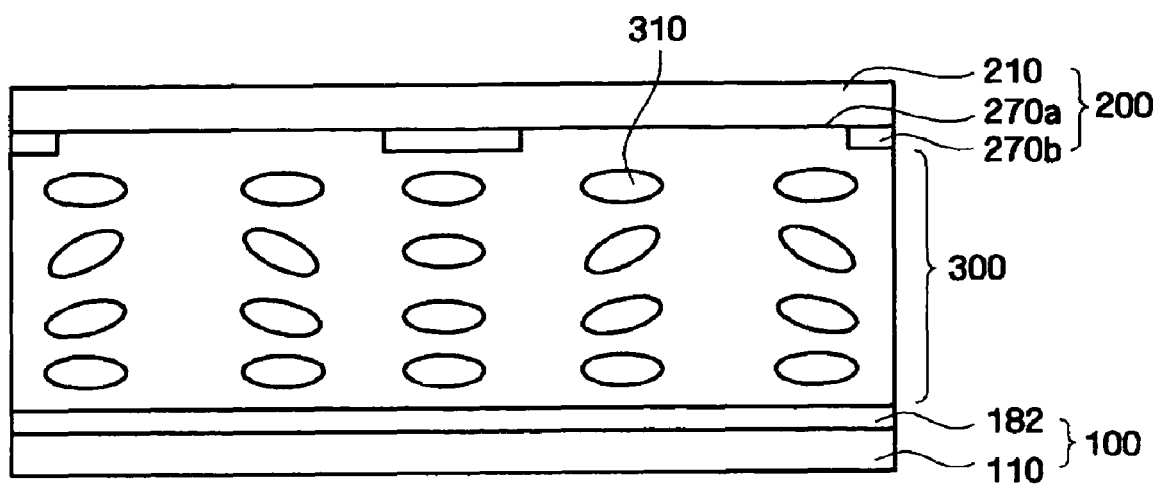
FIG. 15 is a schematic sectional view illustrating the arrangement of liquid crystal molecules when a thin film transistor of the liquid crystal display according to the third embodiment of the present invention is in an "ON" state.

Next, referring to FIGS. 12 and 15, with respect to the arrangement of the liquid crystal molecules 310 in an "ON" state thin film transistor, when the thin film transistor is turned-on and an image signal is applied to the pixel electrode 182, an electric field is generated between the first plate 100 and the second plate 200. At this time, in portions of the pixel electrode 182 corresponding to central portions of the common electrode portions 270b interposed between the openings 270a of common electrode 270, there is generated a vertical electric field directing toward the central portions of the common electrode portions 270b. On the other hand, a horizontal electric field which is not directed to common electrode 270 but is converged is generated in portions of the pixel electrode 182 corresponding to the openings 270a. The liquid crystal molecules 310 adjacent to the alignment films 190 and 280 maintain their original alignments, whereas the liquid crystal molecules 310 disposed in the central area of the liquid crystal layer 300 are rotated so that their long axes are aligned vertically with respect to an applied electric field due to the negative dielectric anisotropy. At this time, the liquid crystal molecules 310 are uniformly rotated in the same direction based on a tilted angle created by rubbing of the alignment films 190 and 280.

In the liquid crystal display according to the above-described embodiment, common electrode 270 has a plurality of the openings 270a having a predetermined shape, whereas the pixel electrode 182 formed in the pixel area is not subjected to patterning. Even though the pixel electrode 182 is not subjected to patterning, the liquid crystal display of this embodiment shows transmittance comparable to a PVA mode, like the liquid crystal display of the first embodiment of the present invention. Also, since the pixel electrode 182 is not subjected to patterning, there is no misalignment between the pixel electrode 182 of the first plate 100 and common electrode 270 of the second plate 200, thereby causing no electric field distortion. Furthermore, an overlap area between the pixel electrode 182 and common electrode 270 is reduced, thereby leading to low liquid crystal capacitance. Still furthermore, since the liquid crystal molecules 310 are tilted at a predetermined angle with respect to the openings 270a of common electrode 270 in a voltage-off state, they can be uniformly rotated in the same direction in a voltage-on state. Therefore, the liquid crystal display of this embodiment is free from textures that are caused between liquid crystal molecules rotating in different directions, thereby leading to no abnormal domains. In addition, the liquid crystal display of this embodiment shows maximal transmittance compared to another liquid crystal displays using liquid crystal molecules with higher dielectric anisotropy and the same voltage, and the in-plane movement of the directors of the liquid crystal molecules 310 increases, thereby ensuring better visibility.

Figure 16:
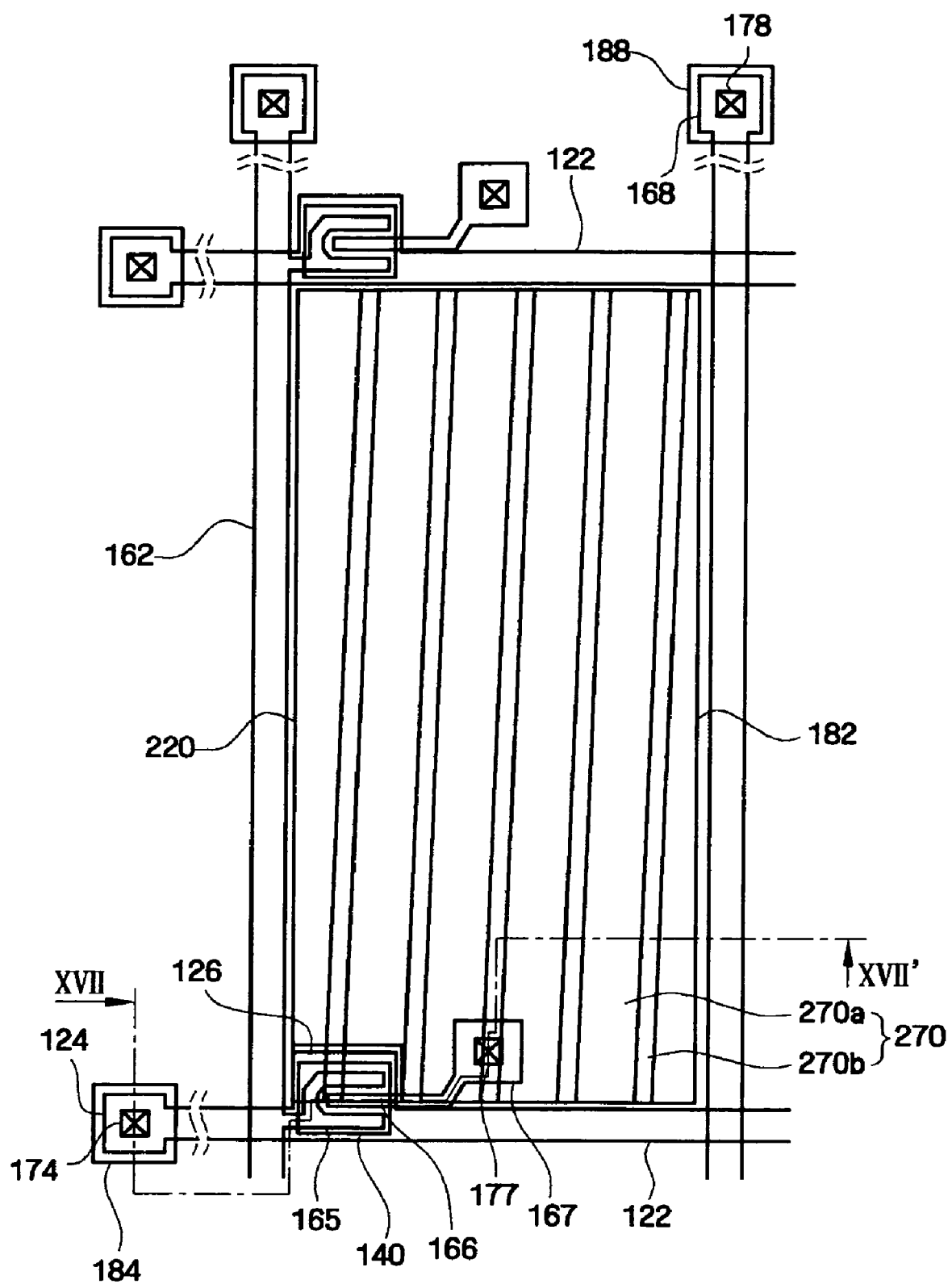
FIG. 16 is a layout of a liquid crystal display according to a fourth embodiment of the present invention.

Hereinafter, a liquid crystal display according to a fourth embodiment of the present invention will be described with reference to FIGS. 16 and 17. FIG. 16 is a layout of a liquid crystal display according to the fourth embodiment of the present invention, and FIG. 17 is a sectional view taken along a line XVI-XVI' of FIG. 16.

The liquid crystal display of this embodiment is the same as the liquid crystal display including the openings 270a of common electrode 270 parallel to the longer side of the pixel area according to the previous embodiment except that an alignment film (190) of a first plate 100 and an alignment film 280 of a second plate 200 are rubbed at an angle of 90 degrees with respect to the longer side of a pixel area under the condition that the rubbing direction of alignment film 190 of the first plate 100 and the rubbing direction of alignment film 280 of the second plate 200 form an angle of 180 degrees, and openings 270a of a common electrode 270 are formed parallel to each other in a state in which they are inclined at a predetermined angle, e.g., an angle from 60 to 85 degrees, with respect to the rubbing direction of alignment film 280 of the second plate 200. Thus, the repeated descriptions will be omitted.

Next, the liquid crystal molecule arrangement in the on/off state of a thin film transistor of the liquid crystal display according to the illustrative embodiment will now be described with reference to FIGS. 17 through 20. FIGS. 18 and 19 are respectively schematic plan and sectional views illustrating the arrangement of liquid crystal molecules when a thin film transistor of the liquid crystal display according to the fourth embodiment of the present invention is in an "OFF" state, and FIG. 20 is a schematic sectional view illustrating the arrangement of liquid crystal molecules when a thin film transistor of the liquid crystal display according to the fourth embodiment of the present invention is in an "ON" state.

Figure 17:
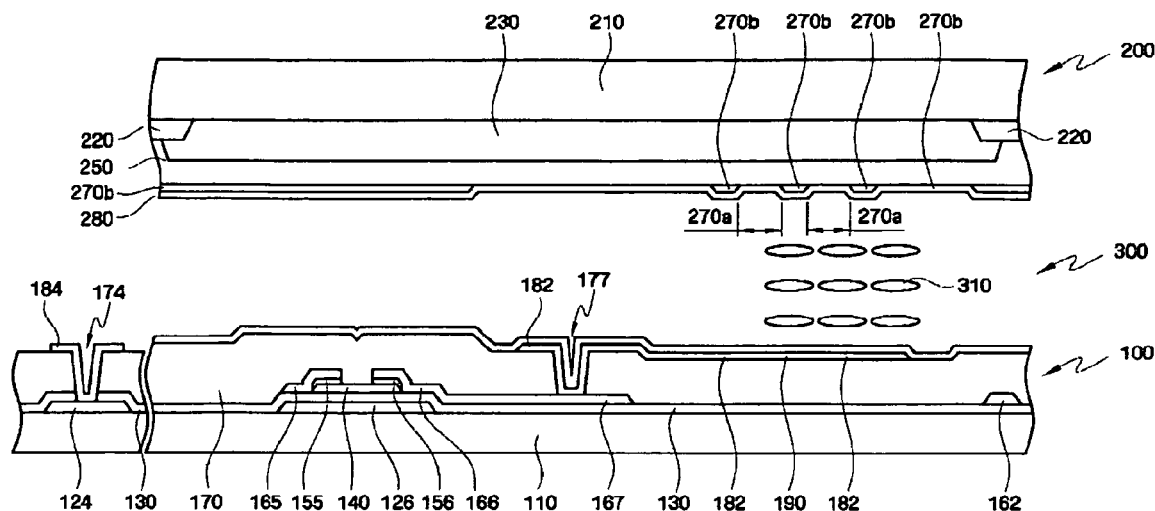
FIG. 17 is a sectional view taken along a line XVI-XVI' of FIG. 16.
Figure 18:
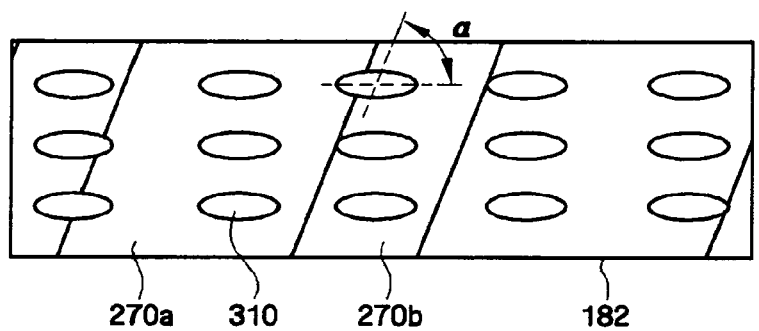
FIGS. 18 and 19 are respectively schematic plan and sectional views illustrating the arrangement of liquid crystal molecules when a thin film transistor of the liquid crystal display according to the fourth embodiment of the present invention is in an "OFF" state.
Figure 19:
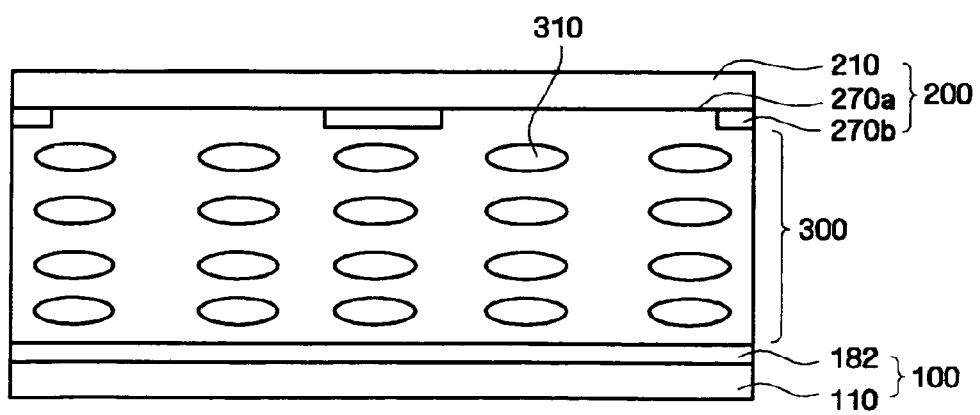

First, referring to FIGS. 17 through 19, with respect to the liquid crystal molecule arrangement in an "OFF" state thin film transistor, liquid crystal molecules 310 between a pixel electrode 180 formed in the pixel area, and common electrode 270 including the openings 270a which are parallel to each other and inclined at a predetermined angle, e.g., at an angle of 60 to 85 degrees with respect to the rubbing direction of alignment film 280 of the second plate 200 rubbed at an angle of 90 degrees with respect to the longer side of the pixel area, are aligned parallel to the rubbing direction of the horizontal alignment films in a state in which their long axes are inclined at a pretilt angle of 0.5 to 3 degrees with respect to the surfaces of first and second substrates 110 and 210. That is, the long axes of the liquid crystal molecules 310 are arranged at an angle of approximately 90° with respect to a longer side of the pixel area. Consequently, the long axes of the liquid crystal molecules 310 are arranged at a tilt angle ($\alpha$) of approximately 60 to approximately 85° with respect to the sub electrode 182a.

Figure 20:
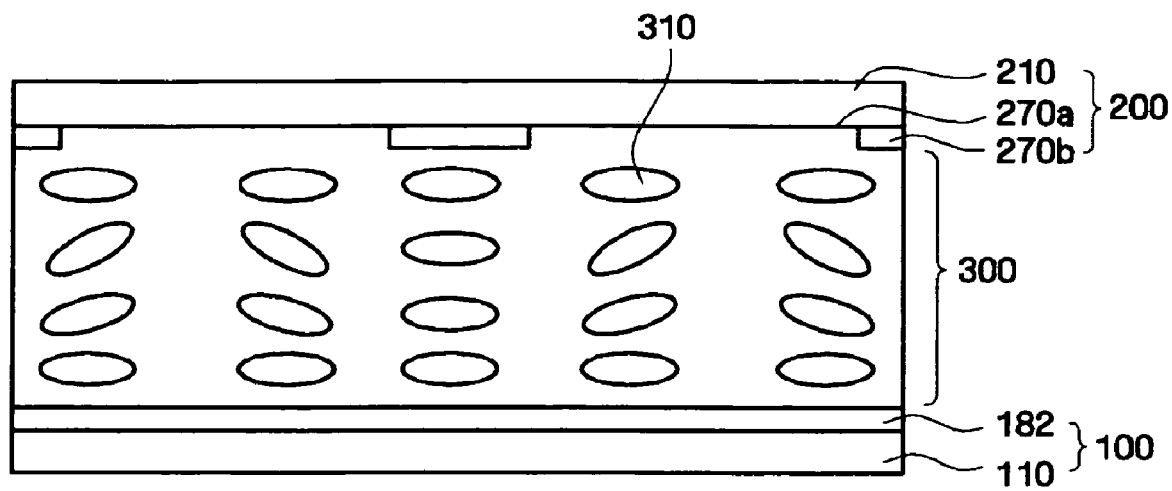
FIG. 20 is a schematic sectional view illustrating the arrangement of liquid crystal molecules when a thin film transistor of the liquid crystal display according to the fourth embodiment of the present invention is in an "ON" state.

Next, referring to FIGS. 17 and 20, with respect to the arrangement of the liquid crystal molecules 310 in an "ON" state thin film transistor, when the thin film transistor is turned-on and an image signal is applied to the pixel electrode 182, an electric field is generated between the first plate 100 and the second plate 200. At this time, in portions of the pixel electrode 182 corresponding to central portions of the common electrode portions 270b between the openings 270a of common electrode 270a, there is generated a vertical electric field directing toward the central portions of the common electrode portions 270b. On the other hand, a horizontal electric field which is not directed to the common electrode portions 270b but is converged is generated in portions of the pixel electrode 182 corresponding to the openings 270a. The liquid crystal molecules 310 adjacent to the alignment films (190 and 280) maintain their original alignments, whereas the liquid crystal molecules 310 disposed in the central area of the liquid crystal layer 300 are rotated so that their long axes are aligned vertically with respect to an applied electric field due to the negative dielectric anisotropy. At this time, the liquid crystal molecules 310 are uniformly rotated in the same direction based on a tilted angle created by rubbing of the alignment films (190 and 280).

The liquid crystal display according to the illustrative embodiment shows transmittance comparable to a PVA mode, like the liquid crystal display including the openings 270a parallel to the longer side of the pixel area according to the previous embodiment of the present invention. Also, since the pixel electrode 182 is not subjected to patterning, there is no misalignment between the pixel electrode 182 of the first plate 100 and common electrode 270 of the second plate 200, thereby causing no electric field distortion. Furthermore, an overlap area between the pixel electrode 182 and common electrode 270 is reduced, thereby leading to low liquid crystal capacitance. Still furthermore, since the liquid crystal molecules 310 are tilted at a predetermined angle with respect to the openings 270a of common electrode 270 in a voltage-off state, they can be uniformly rotated in the same direction in a voltage-on state. Therefore, the liquid crystal display of this embodiment is free from spurious patterns called "textures" that are caused between liquid crystal molecules rotating in different directions, thereby leading to no abnormal domains. In addition, the liquid crystal display of this embodiment shows maximal transmittance compared to other liquid crystal displays using liquid crystal molecules with higher dielectric anisotropy and the same voltage. Also, the in-plane movement directions of the liquid crystal molecules 310 increases, thereby ensuring better visibility.

Hereinafter, the present invention will be described more specifically with reference to experimental example. The following experimental example is for illustrative purposes and is not intended to limit the scope of the invention.

Figure 21:
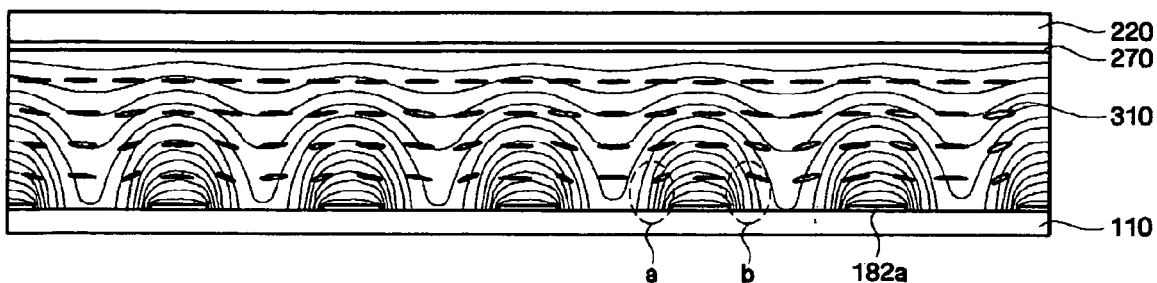
FIG. 21 is a sectional diagram illustrating equipotential lines formed in the "ON" state of a thin film transistor of a liquid crystal display according to an embodiment of the present invention.

First, the characteristics of a liquid crystal display according to an embodiment of the present invention were evaluated through simulation, and the maximum transmittance of the liquid crystal display obtained through the simulation is presented in Table 1 below. In Table 1, w is a width of each sub-electrode of a pixel electrode, L is a distance between sub-electrodes of a pixel electrode, D is a cell gap, $\Delta n$ is birefringence, $\Delta \epsilon$ is dielectric anisotropy, and $\Phi$ is an angle between sub-electrodes of a pixel electrode and a rubbing direction. The equipotential lines formed in the "ON" state of thin film transistors of the liquid crystal display of this experimental example are diagrammatically illustrated in FIG. 21. FIG. 21 illustrates the equipotential lines formed between stripe-shaped sub-electrodes 182a formed on a first substrate 110 of a first plate 100 and a common electrode 270 formed on a second substrate 210 of a second plate 200, and the arrangement of liquid crystal molecules 310 having negative dielectric anisotropy in a liquid crystal display according to an embodiment of the present invention.

TABLE 1

| | LCD Characteristics | | | | | |
|---|---|---|---|---|---|---|
| | w | L | D | $\Delta n$ | $\Delta \epsilon$ | $\Phi$ | Transmittance (%) |
| Experimental Example | 4 | 11 | 5.2 | 0.0800 | −6 | 80 | 42.29 |

As shown in Table 1 and FIG. 21, the transmittance of the liquid crystal display according to this experimental example was approximately 42.29% which was equal to or greater than that of a PVA-mode liquid crystal display.

As described above, a liquid crystal display according to the present invention minimizes an overlap area between field-generating electrodes and has the structure capable of allowing liquid crystal molecules to be aligned horizontally and generating a horizontal electric field, thereby increasing visibility and transmittance. Furthermore, since any one of field-generating electrodes is patterned, less electrostatic problems are caused. There, there is no need to form a conductive polarization plate, thereby increasing process efficiency. Also, there is no misalignment between a first plate and a second plate, thereby causing no electric field distortion.

As hereinabove described, the alignment layer aligns liquid crystal molecules in a predetermined direction and is advantageously made of a polyimide or polyamide acid. The "rubbing" is performed by rubbing the alignment layer in a specific direction using a fabric. When the alignment layer is rubbed, the liquid crystal molecules are arranged in the specific direction. Those skilled in the art will understand the kinds of materials of which the alignment layer may be made and how the rubbing is performed. The present invention is characterized in that the common electrode need not be patterned and the liquid crystal molecules are initially aligned to have a predetermined angle with respect to the sub electrode 182 using a horizontal alignment layer.

In concluding the detailed description, those skilled in the art will appreciate that many variations and modifications can be made to the preferred embodiments without substantially departing from the principles of the present invention. Therefore, the disclosed preferred embodiments of the invention are used in a generic and descriptive sense only and not for purposes of limitation.

What is claimed is:

1. A liquid crystal display comprising:
   a first substrate;
   a thin film transistor disposed on the first substrate;
   a passivation layer disposed on the thin film transistor;
   a first electrode, disposed on the passivation layer and electrically connected to the thin film transistor thorough a first contact hole disposed on the passivation layer, comprising:
   a plurality of sub-electrodes which are separated from each other by a predetermined distance and arranged parallel to each other, and
   a connecting electrode electrically connecting the sub-electrodes; and
   a first alignment film directly contacting the first electrode;
   a second substrate;
   a second electrode disposed on the second substrate; a second alignment film disposed on the second electrode;
   a liquid crystal layer comprising liquid crystal molecules interposed between the first substrate and the second substrate; and wherein the first alignment film has been rubbed in a first direction and the second alignment film has been rubbed in a second direction.

2. The liquid crystal display of claim 1, wherein the passivation layer comprises an inorganic material.

3. The liquid crystal display of claim 1, wherein the passivation layer comprises an organic material.

4. The liquid crystal display of claim 1, further comprising:
   a gate wire disposed on the first substrate and comprising a gate electrode;
   a gate insulating layer disposed on the gate line; and
   a data wire disposed on the gate insulating layer and comprising a drain electrode and a source electrode.

5. The liquid crystal display of claim 4, further comprising:
   a gate pad disposed at an end of the gate line; and
   a data pad disposed at an end of the data line.

6. The liquid crystal display of claim 5, wherein the passivation layer is disposed on the gate wire and the data wire.

7. The liquid crystal display of claim 6, further comprising:
   a auxiliary gate pad disposed on the passivation layer and electrically connected to the gate pad thorough a second contact hole disposed on the passivation layer; and
   a auxiliary data pad disposed on the passivation layer and electrically connected to the gate pad thorough a third contact hole disposed on the passivation layer.

8. The liquid crystal display of claim 1, wherein long axes of the liquid crystal molecules are substantially parallel to the first substrate and second substrate.

9. The liquid crystal display of claim 8, wherein the first and second alignment films are horizontal-alignment films.

10. The liquid crystal display of claim 8, wherein liquid crystal molecules constituting the liquid crystal layer have negative dielectric anisotropy.

11. The liquid crystal display of claim 1, wherein the pre-tilt angle of liquid crystal molecules constituting the liquid crystal layer is in a range between 0.5 and 3 degrees.

12. The liquid crystal display of claim 1, wherein the first direction and the second direction form an angle of 180 degrees.

13. The liquid crystal display of claim 12, wherein the sub-electrodes and the first direction form an angle of 60 to 85 degrees.

14. The liquid crystal display of claim 1, wherein a width of each of the sub-electrodes is 6 μm or less.

15. The liquid crystal display of claim 1, wherein a distance between the sub-electrodes is in a range between 4 and 14 μm.

16. The liquid crystal display of claim 1, wherein the second electrode comprises a planar shape.

17. The liquid crystal display of claim 15, wherein the second alignment film directly contacts the second electrode.

18. The liquid crystal display of claim 1, wherein the connecting electrode is connected the sub-electrodes at a side of the sub-electrodes.

19. The liquid crystal display of claim 1, wherein the connecting electrode is connected the sub-electrodes at the center portion of the sub-electrodes.

* * * * *